(12) United States Patent
Matsumoto

(10) Patent No.: US 10,499,564 B2
(45) Date of Patent: Dec. 10, 2019

(54) UTILITY VEHICLE

(71) Applicant: Honda Motor Co., Ltd., Tokyo (JP)

(72) Inventor: Takuya Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 62 days.

(21) Appl. No.: 15/796,428

(22) Filed: Oct. 27, 2017

(65) Prior Publication Data

US 2018/0116109 A1 May 3, 2018

(30) Foreign Application Priority Data

Oct. 31, 2016 (JP) ................................. 2016-213434

(51) Int. Cl.
| | | |
|---|---|---|
| *A01D 34/00* | (2006.01) | |
| *G05D 1/02* | (2006.01) | |
| *A01D 34/81* | (2006.01) | |
| *A01D 34/82* | (2006.01) | |
| *A01D 34/78* | (2006.01) | |
| *A01D 101/00* | (2006.01) | |

(52) U.S. Cl.
CPC ........... *A01D 34/008* (2013.01); *A01D 34/78* (2013.01); *A01D 34/81* (2013.01); *A01D 34/828* (2013.01); *G05D 1/0227* (2013.01); *A01D 2101/00* (2013.01); *G05D 2201/0208* (2013.01)

(58) Field of Classification Search
CPC .... A01D 34/006; A01D 34/008; A01D 34/81; A01D 34/828; G05D 1/00; G05D 1/0227
USPC .................................................... 296/136.02
See application file for complete search history.

(56) References Cited

U.S. PATENT DOCUMENTS

| | | | | |
|---|---|---|---|---|
| 5,163,273 A | * | 11/1992 | Wojtkowski | ......... A01D 34/008 56/11.9 |
| 9,766,627 B2 | * | 9/2017 | Jagenstedt | ........... A01D 34/008 |
| 2010/0306932 A1 | * | 12/2010 | Schneider | ............ G05D 1/0227 15/3 |
| 2014/0373497 A1 | * | 12/2014 | Bjorn | ..................... A01D 75/18 56/10.2 R |

FOREIGN PATENT DOCUMENTS

| | | |
|---|---|---|
| CN | 102523841 A | 7/2012 |
| EP | 2687077 A2 | 1/2014 |
| JP | S57065260 U1 | 4/1982 |
| JP | 2016161003 A | 9/2016 |
| WO | 2014007728 A1 | 1/2014 |
| WO | 2017109879 A1 | 6/2017 |

* cited by examiner

*Primary Examiner* — Jason S Daniels
(74) *Attorney, Agent, or Firm* — Duft & Bornsen, PC

(57) ABSTRACT

A utility vehicle equipped with driving wheels attached to a chassis to run about a working area and a cover suspension connecting the chassis and a cover attached to the chassis. The cover suspension is provided with a shaft disposed to extend in gravity axis direction between the chassis and the cover with an upper portion attached to the cover and a lower portion attached to the chassis, and a converting member fastened to the shaft to convert force acting on the shaft to movement in a horizontal direction orthogonal to the gravity axis direction. In the vehicle, the shaft is made of resin, and a reinforcing member is inserted in an axial core of the shaft extending downward in the gravity axis direction in the shaft beyond a position where the converting member is fastened to.

7 Claims, 4 Drawing Sheets

UTILITY VEHICLE

CROSS-REFERENCE TO RELATED APPLICATIONS

This application is based upon and claims the benefit of priority from Japanese Patent Application No. 2016-213434 filed on Oct. 31, 2016, the contents of which are incorporated herein by reference.

BACKGROUND OF THE INVENTION

Field of the Invention

This invention relates to a utility vehicle, particularly to a utility vehicle wherein a cover attached to a chassis is equipped with one or more suspensions.

Description of Related Art

In a utility vehicle of this type, a cover attached to a chassis is equipped with suspensions (cover suspensions), and the applicant also previously proposed a structure of such a suspension in International Patent Publication No. WO 2017/109879 A1.

The cover suspension described in the reference comprises a resin shaft that is attached to a chassis and a cover to extend in gravity axis direction between, and a converting member provided thereon to convert force acting on the shaft to movement in a horizontal direction orthogonal to the gravity axis direction.

In a cover suspension for a utility vehicle of this type, bending moment and other forces act on a shaft, but when the shaft is made of resin, the only way to increase its strength is to enlarge (thicken) its diameter. Disadvantageously, that leads to problems, including that it leads to changes in the sizes of other components.

SUMMARY OF THE INVENTION

Therefore, an object of this invention is to provide a utility vehicle equipped with a cover suspension that enables reinforcement of a shaft made of resin without enlarging its diameter and making it possible to avoid problems such as change in the size of other components.

In order to achieve the object, this invention provides a utility vehicle equipped with driving wheels attached to a chassis to run about a working area and a cover suspension connecting the chassis and a cover attached to the chassis; the cover suspension comprising, a shaft disposed to extend in gravity axis direction between the chassis and the cover with an upper portion attached to the cover and a lower portion attached to the chassis, and a converting member fastened to the shaft to convert force acting on the shaft to movement in a horizontal direction orthogonal to the gravity axis direction, wherein the shaft is made of resin, and a reinforcing member is inserted in an axial core of the shaft extending downward in the gravity axis direction in the shaft beyond a position where the converting member is fastened to.

BRIEF DESCRIPTION OF THE DRAWINGS

The above and other objects and advantages will be more apparent from the following description and drawings, in which.

DETAILED DESCRIPTION OF THE INVENTION

In the following, a utility vehicle according to an embodiment of this invention is explained with reference to the attached drawings.

Figure 1:
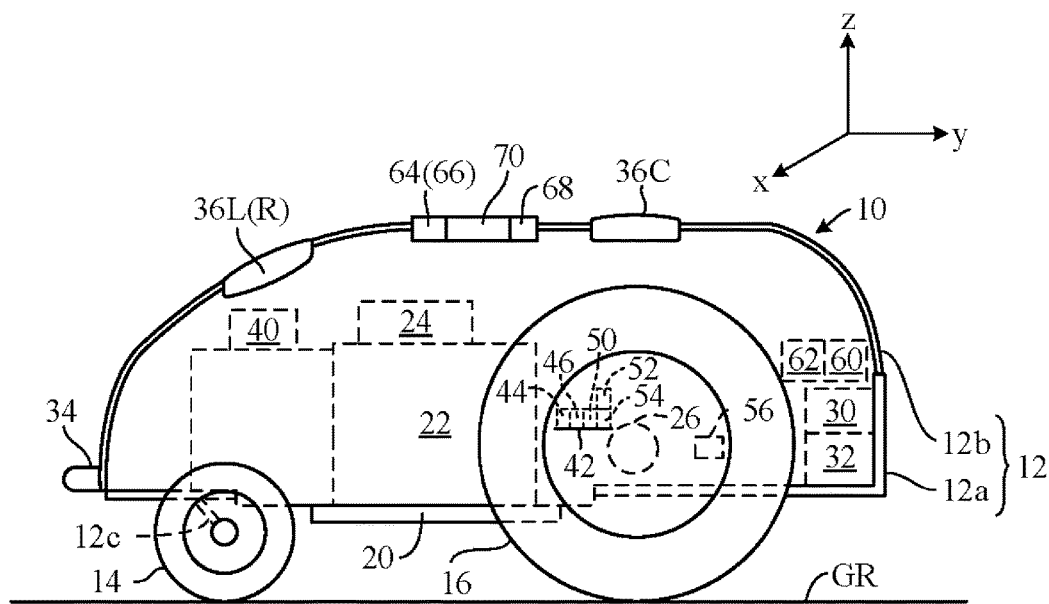
FIG. 1 is a conceptual diagram showing an overview of a utility vehicle according to an embodiment of this invention.
Figure 2:
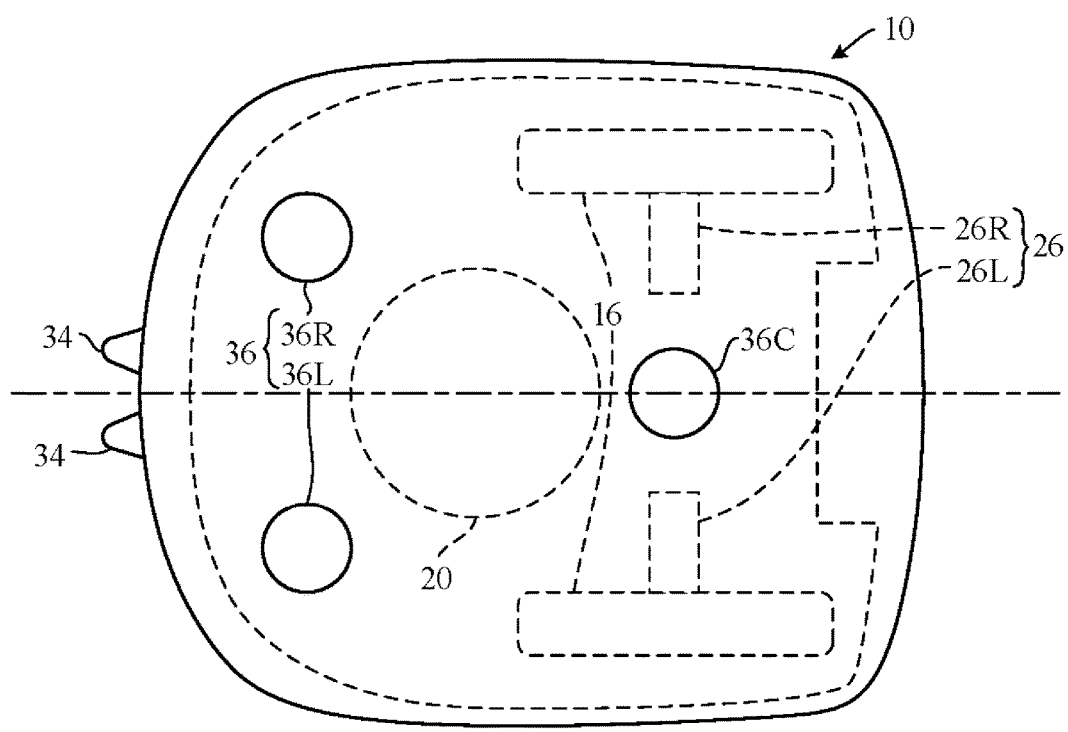
FIG. 2 is a top view of the utility vehicle of FIG. 1.
Figure 3:
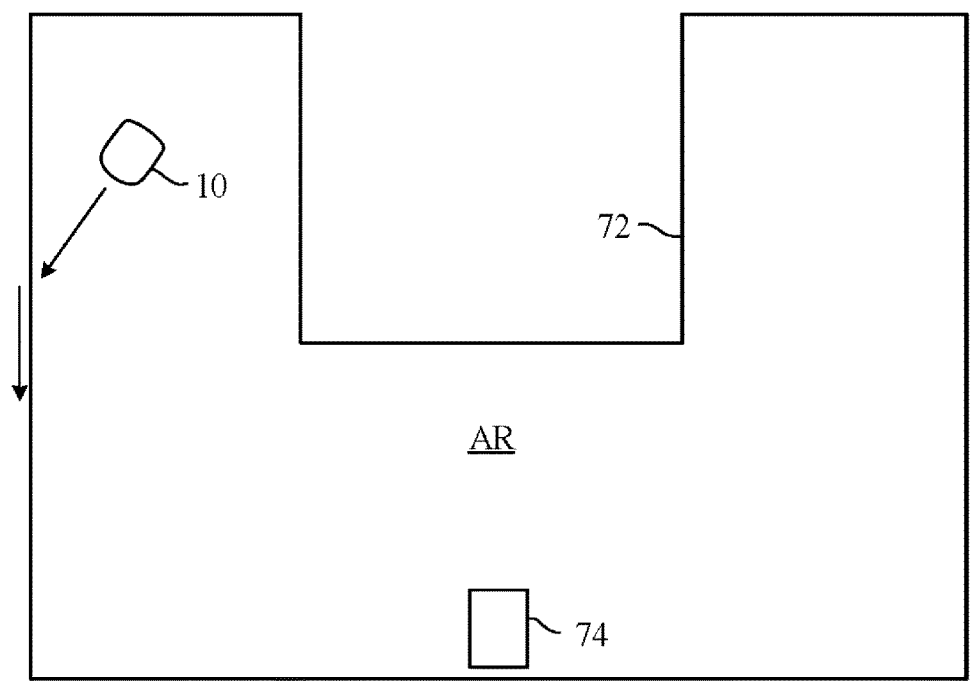
FIG. 3 is a diagram for explaining, inter alia, a working area of the utility vehicle of FIG. 1.
Figure 4:
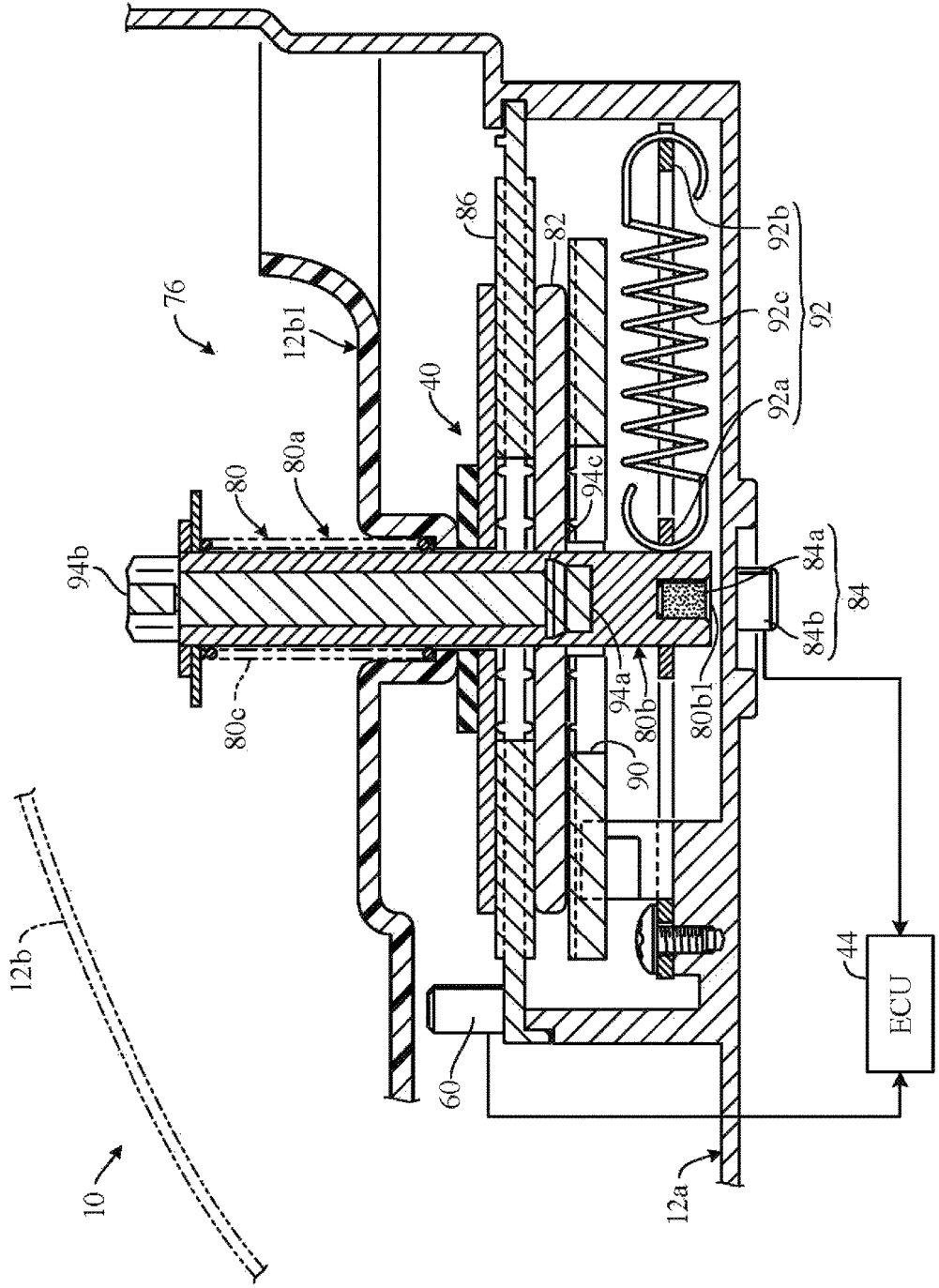
FIG. 4 is an explanatory cross-sectional view of a cover suspension of the vehicle shown in FIG. 1.
Figure 5:
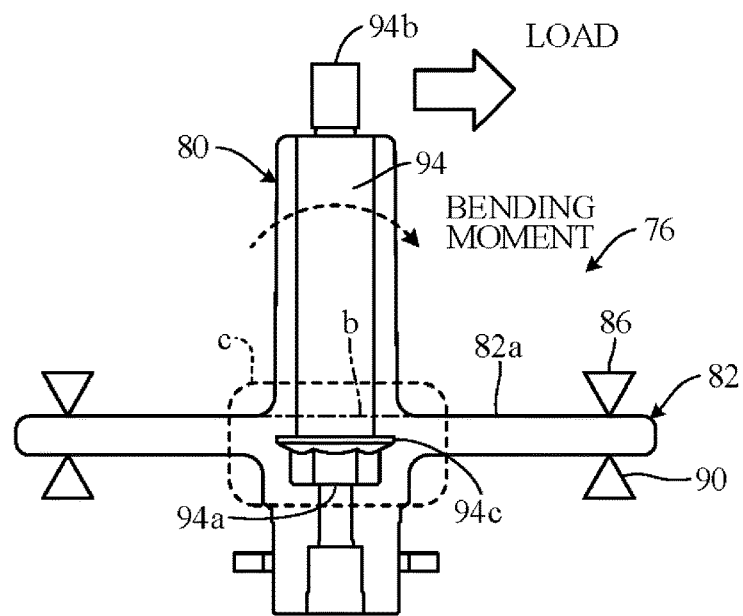
FIG. 5 is a schematic side view of the cover suspension shown in FIG. 4.

FIG. 1 is a conceptual diagram showing an overview of a utility vehicle according to an embodiment of this invention; FIG. 2 is a top view of the utility vehicle of FIG. 1; FIG. 3 is a plan view of a working area in which the utility vehicle of FIG. 1 runs; FIG. 4 is a plan view of a cover suspension of the utility vehicle; and FIG. 5 is a side view thereof.

Symbol 10 in FIG. 1 and other drawings designates a utility vehicle (hereinafter called "vehicle"). The vehicle 10 is actually implemented as a lawnmower. A body 12 of the vehicle 10 comprises a chassis (body frame) 12a and a cover 12b displaceably attached to the chassis 12a.

The vehicle 10 is equipped with two front wheels 14 of relatively small diameter fixed by stays 12c to left and right sides of the chassis 12a toward its front end in the forward-rearward direction, and with left and right rear wheels 16 of relatively large diameter directly attached to the chassis 12a toward its rear end.

A blade 20 (work unit, specifically a rotary blade) for lawn mowing work is attached near the middle of the chassis 12a of the vehicle 10, and an electric motor (prime mover; hereinafter called "work motor") 22 is installed above it. The blade 20 is connected to the work motor 22 and driven to rotate by the work motor 22.

A blade height regulation mechanism 24 manually operable by a user (operator) is connected to the blade 20. The blade height regulation mechanism 24 is equipped with a handle 24a operable by the user, and the user can regulate height of the blade 20 above ground surface GR by manually rotating the handle 24a.

Two electric motors (prime movers; hereinafter called "driving motors") 26L and 26R are attached to the chassis 12a of the vehicle 10 rearward of the blade 20. The driving motors 26L and 26R are connected to the left and right rear wheels 16 to be rotated normally (rotate to move forward) or reversely (rotate to move backward) independently on the left and right, with the front wheels 14 as non-driven wheels and the rear wheels 16 as driven wheels. The blade 20, work motor 22, driving motors 26 and so on are covered by the cover 12b.

In this embodiment, the vehicle 10 is of such weight and size as to be portable by the user. For example, the vehicle 10 has a total length (forward-rearward direction length) of about 71 cm, total width about 55 cm, and height about 30 cm.

An onboard charging unit 30 and an onboard battery 32 connected thereto are housed at the rear of the utility vehicle 10, and a pair of battery charging terminals 34 are attached to the chassis 12a so as to project forward from a front end position. The battery charging terminals 34 are connected to the onboard charging unit 30. The work motor 22 and driving motors 26 are connected to the onboard battery 32 and are powered by the onboard battery 32.

Left and right magnetic sensors 36L and 36R are installed toward the front end of the body 12 of the vehicle 10 and a single magnetic sensor 36C is installed toward the rear end. The magnetic sensors 36 generates outputs indicating magnetic field strength.

A contact sensor 40 is attached to the body 12 to detect displacement between the cover 12b and the chassis 12a caused by contact of the vehicle 10 with an obstacle or foreign object. The contact sensor 40 is explained in detail below.

A housing box installed near the middle of the chassis 12a houses a printed circuit board 42 carrying an electronic control unit (hereinafter called "ECU") 44, which comprises a computer equipped with a processor (CPU), I/O, memory (ROM, EEPROM and RAM) and other components.

The printed circuit board 42 is provided thereon, in the vicinity of the ECU 44, with an angular velocity sensor 46 that generates an output indicating angular velocity (yaw rate) around a center-of-gravity z-axis (gravity axis) of the vehicle 10, an acceleration sensor 50 that generates an output indicating acceleration acting on the vehicle 10 in orthogonal three-axis (x, y and z) directions, an orientation sensor 52 that generates an output indicating absolute orientation (direction) in response to terrestrial magnetism, and a GPS sensor 54 that receives radio waves from GPS satellites and generates an output indicting current position of the vehicle 10.

Wheel speed sensors 56 installed near the left and right rear wheels 16 of the vehicle 10 generate outputs indicating wheel speeds of the left and right rear wheels 16, and a lift sensor 60 installed between the chassis 12a and the cover 12b detects lifting of the cover 12b off the chassis 12a, by the user, for example. A current sensor 62 installed on the onboard battery 32 generates an output indicating consumption of onboard battery 32 current.

The vehicle 10 is equipped with a main switch 64 for instructing start of work operation and an emergency stop switch 66 for instructing emergency stop, both of which are operable by the user. In addition, the top of the cover 12b has a large cutaway in which a keyboard, touch panel or other input device 68 is installed for input of instructions and the like by the user, and a display 70 is installed near the input device 68. The input device 68 and the display 70 are connected to the ECU 44, and the display 70 displays working modes and other various information in accordance with commands sent from the ECU 44.

The outputs of the magnetic sensors 36, contact sensor 40, angular velocity sensor 46 and other sensors, and the outputs of the main switch 64 and other switches are sent to the ECU 44. Based on these outputs, the ECU 44 applies power from the onboard battery 32 to the driving motors 26 and outputs control values to control navigation of the vehicle 10 by controlling operation of the driving motors 26.

The ECU 44 detects (recognizes) a working area AR from the outputs of the magnetic sensors 36 and accordingly applies power to the work motor 22 so as to service the working area AR.

As shown in FIG. 3, the working area AR is delineated by a boundary wire (electrical wire) 72 laid around its periphery (boundary). A charging station 74 for charging the onboard battery 32 of the vehicle 10 is installed in the working area AR. (In FIG. 3, sizes of the vehicle 10 and so on are exaggerated.) The vehicle 10 is exemplified as an autonomously navigating vehicle that runs or navigates autonomously while detecting magnetic field of the boundary wire 72 laid around the working area AR.

As a characterizing feature of this invention resides in the structure of a cover suspension of the vehicle 10 configured as set out above, this structure is explained with reference to FIG. 4 and ensuing drawings in the following.

FIG. 4 is an explanatory cross-sectional view of a cover suspension (designated by symbol 76) of the vehicle 10 shown in FIG. 1. The cover suspension 76 connects the cover 12b to the chassis 12a and allows relative motion between them.

As illustrated, the cover suspension 76 according to this embodiment comprises a shaft (axis) 80 and a plate-like converting member 82 (plus a detector 84).

The shaft 80 is installed in a space between the chassis 12a and the cover 12b to extend in gravity axis direction between the chassis 12a and the cover 12b, and has an upper portion 80a attached to the cover 12b and lower portion 80b attached to the chassis 12a.

More specifically, the shaft 80 is attached to the cover 12b at the upper portion 80a through a detachable lock member 12b1. A compressed coil spring 80c elastically installed on the shaft 80 urges the lock member 12b1 downward, thereby stabilizing the attachment by means of the lock member 12b1.

As termed in this specification, "gravity axis direction" means direction of gravity axis (vertical axis direction; z-axis direction) in an orthogonal coordinate system when, as shown in FIG. 1, the vehicle 10 is resting on ground surface GR The shaft 80 is made of resin. The cover 12b and chassis 12a are also made of resin.

Although illustration is omitted in the drawings, the cover suspension 76 comprising the shaft 80 and converter 82 (plus detector 84) is provided at three locations, one above the front wheels 14 and two at laterally spaced locations above the rear wheels 16 of the vehicle 10. The cover suspension 76 shown in FIG. 4 is configured for installation above the front wheels 14.

The converting member 82 is fastened to the shaft 80 to convert force (force and moment), particularly bending moment, acting on the shaft 80 to movement in a horizontal direction (x-y axis movement) orthogonal to gravity axis direction.

As shown, the converting member 82 is constituted as a plate, namely, as a disk, fastened to the shaft 80, and is formed with a center hole which accommodates and fastens the shaft 80 passed therethrough. Alternatively, the shaft 80 and converter 82 can be integrally fabricated.

Two plate-like guides 86 and 90 are attached to the chassis 12a above and below the converting member 82. The guides 86 and 90 are also made of resin. The converting member 82 is situated so as to slide within a space formed between the guides 86 and 90, whereby force and moment acting on the shaft 80 is converted to movement in a horizontal direction orthogonal to the gravity axis direction.

As illustrated, the cover suspension 76 according to this embodiment is equipped with the detector 84 in addition to the shaft 80 and converting member 82. The detector 84 detects presence/absence of contact with buildings, paving stones, animals, people and other obstacles by sensing displacement between the cover 12b and the chassis 12a based on horizontal movement of the shaft 80 converted by the converting member 82.

A return mechanism 92 that urges the shaft 80 toward neutral position (illustrated upright position) is installed below the guide 90. Although not illustrated in detail, the return mechanism 92 is of overall annular shape in plan view and comprises a member 92a for inserting the shaft 80 through a center hole thereof, a member 92b fixed to a wall member and three tension springs 92c bridging the members 92a and 92b at three locations to hold the shaft 80 in the center hole.

As the shaft 80 is pulled in three directions by the three tension springs 92c of the return mechanism 92, it is constantly urged to neutral position and is returned to neutral position when a force acts thereon.

The aforesaid detector 84 is located near the return mechanism 92. The detector 84 comprises a permanent magnet or other ferromagnetic magnetic body 84a accommodated in the lower end of the shaft 80 and a detection circuit 84b equipped with a Hall effect element or other magnetic sensitive element housed in a case located in the vicinity of the magnetic body 84a at predetermined distance therefrom. Thus, the detector 84 functions as the contact sensor 40 in association with the shaft 80, the converting 82 and the return mechanism 92.

Figure 6:
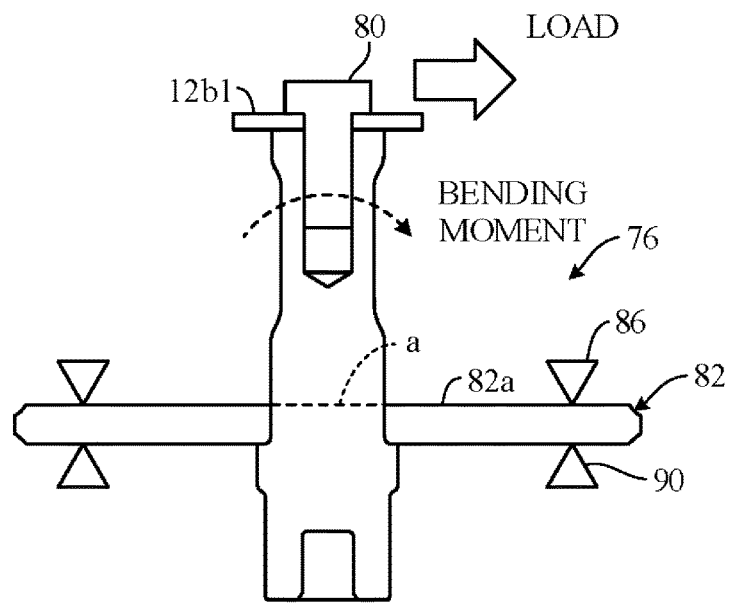
FIG. 6 is a schematic side view of the cover suspension set out in the reference.

FIG. 5 is a schematic side view of the cover suspension 76 according to this embodiment, and FIG. 6 is a schematic side view of the cover suspension set out in the aforesaid reference.

There now follows an explanation of the cover suspension 76 according to this embodiment with reference to FIGS. 5 and 6. As pointed out earlier, bending moment and other forces act on the shaft 80, but when the shaft 80 is made of resin, the only way to increase its strength is to thicken its diameter. However, that leads to problems, including that it leads to changes in the sizes of other components.

Therefore, in the cover suspension 76 according to this embodiment, as shown in FIG. 5, a rigid reinforcing member 94 having rigidity is inserted in the axial core of the shaft 80, its one end 94a extends downward of the site of the converting member 82 in the gravity axis direction in the shaft 80 beyond the position where the converting member (82) is fastened to, and its other end 94b is projected upward from the upper portion 80a of the shaft 80.

Specifically, the reinforcing member 94 is inserted in the axial core of the shaft 80 such that the other end 94b of the reinforcing member 94 projects in the gravity axis direction from the upper portion 80a of the shaft 80. The reinforcing member 92 is made of a rigid material such as metal.

Moreover, load due to the bending moment concentrates especially in the region where the plate-like converting member 82 is attached, and particularly in the vicinity of an imaginary extension indicated in FIG. 6 by broken line a of an upper surface 82a of the plate of the converting member 82.

So to deal with this, a configuration is adopted whereby the reinforcing member 94 has a flange 94c formed at a position corresponding to a location of the shaft 80 where the converting member 82 is fastened to, namely, has a flange 94c formed lower in the gravity axis direction than the upper surface 82a of the plate constituting the converting member 82, still more exactly, has a flange 94c formed a predetermined distance under an extension b (same as the extension a in FIG. 6) of the upper surface 82a of the converting member plate in the gravity direction.

As a result, adequate material thickness can be maintained in the region designated by symbol c, thereby enabling reinforcement of the shaft 80 made of resin without enlarging its diameter (thickening shaft diameter) and making it possible to avoid problems such as change in the size of other components.

As set out in the foregoing, the embodiment is configured to have a utility vehicle (10) equipped with driving wheels (16, the rear wheels driven by the driving motors 26) attached to a chassis (12a) to run about a working area (AR) and a cover suspension (76) connecting the chassis (12a) and a cover (12b) (displaceably) attached to the chassis (12a); the cover suspension (76) comprising, a shaft (80) disposed to extend in gravity axis direction between the chassis (12a) and the cover (12b) with an upper portion (80a) attached to the cover (12b) and a lower portion (80b) attached to the chassis (12a), and a converting member (82) fastened to the shaft (80) to convert force acting on the shaft (80) to movement in a horizontal direction orthogonal to the gravity axis direction, characterized in that: the shaft (80) is made of resin, and a reinforcing member (94) having rigidity is inserted in an axial core of the shaft (80) extending downward, more specifically with one end (94a) extending downward in the gravity axis direction in the shaft (80) beyond a position where the converting member (82) is fastened to.

With this, since a configuration is adopted whereby the cover suspension 76 comprises the rigid reinforcing member 94 inserted in an axial core of the shaft 80 with one end 94a of the reinforcing member 94 extending downward beyond the location of converting member 82 attachment in the gravity axis direction, the insertion of the reinforcing member 94 in the axial core of the shaft 80 enables reinforcement of the shaft 80 without enlarging its diameter.

In addition, the one end 94a of the reinforcing member 94 extends downward beyond the location of converting member 82 attachment, so that strength at the location of converting member 82 attachment where bending moment concentrates can also be ensured.

In the vehicle, the reinforcing member (94) is inserted in the axial core of the shaft (80) such that an end, more specifically other end (94b) of the reinforcing member (94) projects in the gravity axis direction from the upper portion (80a) of the shaft (80). With this, reliable attachment is made possible when attaching to the cover 12b by means of, for example, the suitable lock member 12b1 and a nut.

In the vehicle, the reinforcing member (94) is formed with a flange (94c) at a position corresponding to a location of the shaft (80) where the converting member (82) is fastened to the shaft (80). With this, in addition to the effects and advantages mentioned above, adequate strength can be obtained against bending moment concentrated at the location of converting member 82 attachment and acting on the shaft 80.

In the vehicle, the converting member (82) is constituted as a plate fastened to the shaft (80), and the flange (94c) is formed at a position lower in the gravity axis direction than an upper surface (82a) of the converting member plate. With this, in addition to the effects and advantages, still more strength can be obtained against bending moment concentrated at the location of converting member 82 attachment and acting on the shaft 80.

In the vehicle, the cover suspension (76) includes a detector (84), disposed at a location near the shaft (80), that functions as a contact sensor to detect contact with an obstacle from displacement between the cover (12b) and the chassis (12a) based on horizontal movement of the shaft (80). With this, in addition to the effects and advantages mentioned above, the detector 84 (functioning as the contact sensor 40) can be disposed at an optimal location.

In the vehicle, the cover suspension (76) includes a return mechanism (92) comprising a plurality of springs that urges the shaft (80) to a neutral position. With this, in addition to the effects and advantages mentioned above, the detector 84 functioning as the contact sensor 40 can be improved its accuracy.

In the vehicle, the converting member (82) is constituted as a plate made of resin and is situated to slide within a space formed between a plurality of plate-like guides (86, 90) made of resin. With this, in addition to the effects and advantages mentioned above, the converting member 82 exhibits good slidability with respect to the guides 86 and 90 also made of resin, whereby durability can be enhanced.

In the vehicle, the reinforcing member (94) is made of a rigid material including metal. With this, the insertion of the reinforcing member 94 in the axial core of the shaft 80 enables reinforcement of the shaft 80 more finitely without enlarging its diameter.

Although in the foregoing the vehicle 10 is exemplified as an autonomously navigating vehicle that runs or navigates autonomously while detecting magnetic field of the boundary wire 72 laid around the working area AR, the vehicle 10 is not limited to this type of autonomously navigating vehicle.

Moreover, although the vehicle 10 was described as a lawn-mowing vehicle, this invention is not limited to such an application and can also be applied to other autonomously navigating vehicles capable of driving autonomously.

Further, although an electromagneto transducer, e.g., a Hall effect element, is used as the detection element of the detection circuit 84b of the detector 84, this is not a restriction, and the detection element can be of any type insofar as capable of detecting physical displacement relative to the magnetic body 84a.

While the present invention has been described with reference to the preferred embodiments thereof, it will be understood, by those skilled in the art, that various changes and modifications may be made thereto without departing from the scope of the appended claims.

What is claimed is:

1. A utility vehicle equipped with driving wheels attached to a chassis to run about a working area and a cover suspension connecting the chassis and a cover attached to the chassis; the cover suspension comprising, a shaft disposed to extend in a gravity axis direction between the chassis and the cover with an upper portion attached to the cover and a lower portion attached to the chassis, and a converting member fastened to the shaft to convert force acting on the shaft to movement in a horizontal direction orthogonal to the gravity axis direction, wherein the shaft is made of resin, and a reinforcing member having rigidity is inserted in an axial core of the shaft with one lower end extending downward in the gravity axis direction in the shaft beyond a position where the converting member is fastened to, and the reinforcing member is inserted in the axial core of the shaft such that an upper end, that is opposite the lower end, of the reinforcing member projects in the gravity axis direction from the upper portion of the shaft.

2. The vehicle according to claim 1, wherein the reinforcing member is formed with a flange at a position corresponding to a location of the shaft where the converting member is fastened to the shaft.

3. The vehicle according to claim 2, wherein the converting member is constituted as a plate fastened to the shaft, and the flange is formed at a position lower in the gravity axis direction than an upper surface of the plate.

4. The vehicle according to claim 1, wherein the cover suspension includes a detector, disposed at a location near the shaft, that functions as a contact sensor to detect contact with an obstacle from displacement between the cover and the chassis based on horizontal movement of the shaft.

5. The vehicle according to claim 1, wherein the cover suspension includes a return mechanism comprising a plurality of springs that urges the shaft to a neutral position.

6. The vehicle according to claim 1, wherein the converting member is constituted as a plate made of resin and is situated to slide within a space formed between a plurality of plate-like guides that are made of resin.

7. The vehicle according to claim 1, wherein the reinforcing member is made of a rigid material including metal.

* * * * *